US012123524B2

(12) United States Patent
Alfsen et al.

(10) Patent No.: US 12,123,524 B2
(45) Date of Patent: Oct. 22, 2024

(54) SWIVEL

(71) Applicant: MacGregor Norway AS, Kristiansand (NO)

(72) Inventors: Frode Alfsen, Søndeled (NO); Stig André Kittelsen Nygård, Arendal (NO); Jon Tønnessen, Grimstad (NO)

(73) Assignee: MacGregor Norway AS, Kristiansand (NO)

( * ) Notice: Subject to any disclaimer, the term of this patent is extended or adjusted under 35 U.S.C. 154(b) by 76 days.

(21) Appl. No.: 17/914,613

(22) PCT Filed: Apr. 6, 2021

(86) PCT No.: PCT/NO2021/050092
§ 371 (c)(1),
(2) Date: Sep. 26, 2022

(87) PCT Pub. No.: WO2021/201693
PCT Pub. Date: Oct. 7, 2021

(65) Prior Publication Data
US 2023/0120732 A1     Apr. 20, 2023

(30) Foreign Application Priority Data
Apr. 2, 2020   (NO) .............................. NO20200407

(51) Int. Cl.
*F16L 27/087*     (2006.01)
*F16L 25/01*      (2006.01)
*F16L 27/08*      (2006.01)

(52) U.S. Cl.
CPC ............. *F16L 27/087* (2013.01); *F16L 25/01* (2013.01); *F16L 27/0812* (2013.01)

(58) Field of Classification Search
CPC ...... F16L 27/087; F16L 27/0828; F16L 27/04; F16L 25/01; F16L 39/04
See application file for complete search history.

(56) References Cited

U.S. PATENT DOCUMENTS 2,813,731 A * 11/1957 Ward ....................... F16L 27/04
4,858,961 A *  8/1989 Nunogaki ............... F16L 39/04
5,498,163 A *  3/1996 Takamura ............. F16L 27/087
(Continued)

FOREIGN PATENT DOCUMENTS

GB              558705 A      1/1944
IT       201800003146 A1      8/2019
(Continued)

OTHER PUBLICATIONS

Aasen, Olav Alfred; International Search Report; PCT/NO2021/050092; Dated Jun. 22, 2021; 3 pages.

*Primary Examiner* — Zachary T Dragicevich
(74) *Attorney, Agent, or Firm* — Bradley Arant Boult Cummings LLP

(57) ABSTRACT

A fluid swivel (100) comprising a first part (100*a*) and a second part (100*b*) configured to mutually rotate about a common center axis (A). The swivel (100) has a central bore (101) configured to accommodate a fluid to be transported through the fluid swivel (100). A central member (12) is arranged in the central bore (101), and the center axis (A) extend through the central member. A hydraulic line (43, 53) extends from the first part (100*a*) to the second part (100*b*) through the central member (12).

10 Claims, 5 Drawing Sheets

(56) References Cited

U.S. PATENT DOCUMENTS

| | | |
|---|---|---|
| 5,823,837 A | 10/1998 | Boatman et al. |
| 2017/0089499 A1 | 3/2017 | Harr |
| 2017/0299101 A1* | 10/2017 | Singer ..................... F16L 39/04 |
| 2019/0113162 A1 | 4/2019 | Wermann et al. |
| 2022/0290789 A1* | 9/2022 | Mann ...................... F16L 25/01 |

FOREIGN PATENT DOCUMENTS

| | | |
|---|---|---|
| WO | WO-9502145 A1 | 1/1995 |
| WO | WO-9700806 A1 | 1/1997 |

\* cited by examiner ped
SWIVEL

TECHNICAL FIELD

The present invention relates to a fluid transferring swivel of the type that has a center bore configured for fluid flow.

BACKGROUND ART

In various fields a swivel is used for transmission between mutually rotating parts. For instance, a swivel can be used for force transfer, fluid transfer, electric power or electric control signal transfer, or transfer of fluid pressure.

Fluid swivels are known, that are configured to transfer a flow of fluid while enabling mutual rotation of the opposite axial ends of the swivel.

SUMMARY OF INVENTION

According to the present invention, there is provided a fluid swivel comprising a first part and a second part configured to mutually rotate about a common center axis. The fluid swivel comprises a central bore configured to accommodate a fluid to be transported through the fluid swivel. A central member is arranged in the central bore, wherein the center axis extend through the central member. Furthermore, a hydraulic line extends from the first part to the second part, through the central member.

In some embodiments, the central member can comprise a first central part and a second central part, wherein the first central part is part of the first part and comprises a stem. The second part is part of the second part and comprises a receiving bore. The stem can extend into the receiving bore.

A portion of the hydraulic line can in some embodiments extend through the stem and it can comprise a first line mouth that aligns with an annular recess of the receiving bore.

In this manner, hydraulic liquid and hydraulic pressure can be transmitted through the swivel. The hydraulic liquid can for instance be used to operate a hydraulic actuator that rotates along with the rotating part of the swivel. In other embodiments, the hydraulic liquid can for instance be used to operate a hydraulic motor, e.g. for driving a pump.

In some embodiments, the swivel can comprise an electric transmission arrangement extending from the first part to the second part through the central member. The electric transmission arrangement can for instance be used for transmitting monitoring signals representing various monitored parameters. Alternatively, or in addition, the electric transmission arrangement can be used for controlling electric actuators.

The electric transmission arrangement can advantageously comprise a first electric line and a second electric line, wherein the first electric line is electrically connected to the second electric line over a slip ring arrangement.

The slip ring arrangement can advantageously be arranged such that the center axis extends through the slip ring.

According to some embodiments, the swivel can be connected between a loading hose that carries an oil-containing fluid and a floating vessel. Such a vessel can typically be a tanker configured to transport crude oil.

In some embodiments, the central bore can comprise a bore wall that exhibits a curved shape.

Preferably, in embodiments including the slip ring and the said curved shape, the slip ring can be axially aligned with the curved shape of the bore wall.

Typical diameters of the central bore of the fluid swivel can for some embodiments according to the invention be in the range of 20 to 70 cm, or in the range of 25 to 60 cm.

DETAILED DESCRIPTION OF THE INVENTION

While the invention has been presented in general terms above, a more detailed example of embodiment will be presented below with reference to the drawings, in which FIG. 1 is a perspective view of a swivel according to the invention, being used together with a loading hose for transfer of crude oil onto a tanker;

Figure 1:
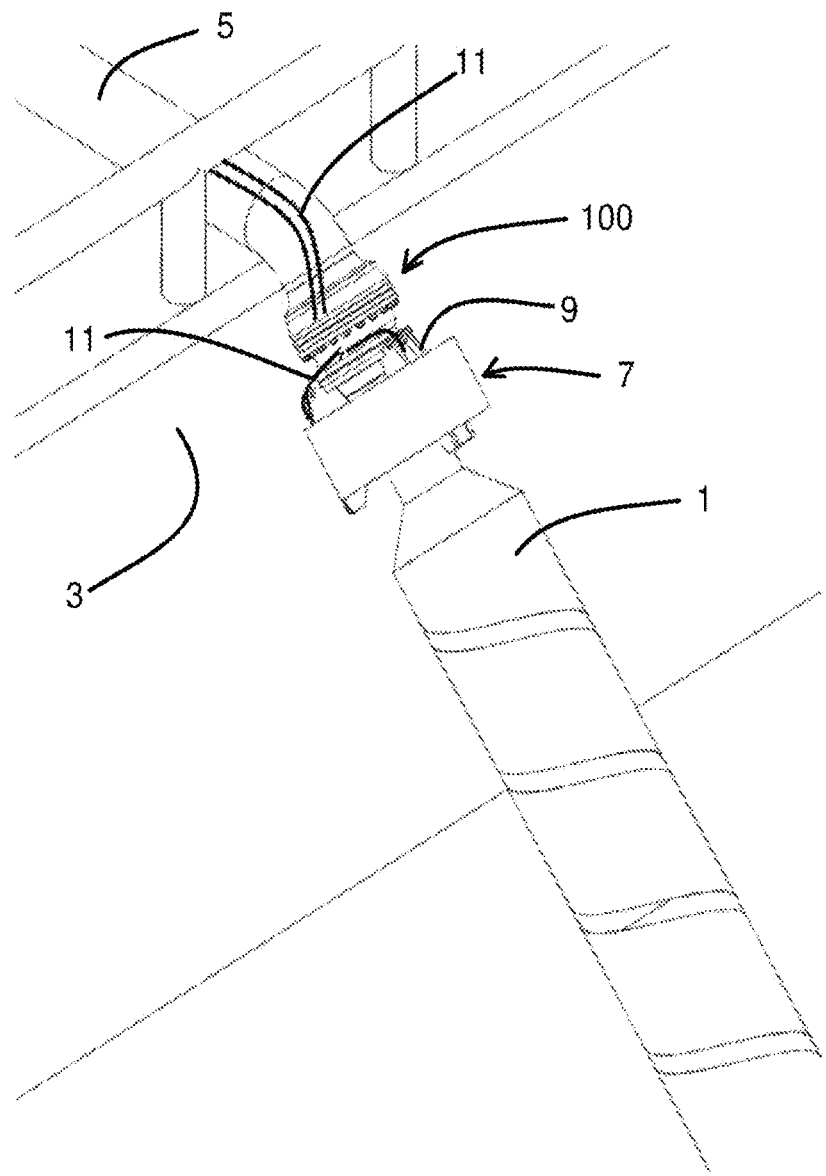

FIG. 1 depicts a loading hose 1 that is connected to a tanker 3 at sea. The loading hose 1 is typically used to transfer crude oil to the tanker 3, such as from an FPSO (not shown). To enable the loading hose 1 to rotate with respect to the tanker 3, there is arranged a fluid swivel 100 at the interface between the tanker 3 and the loading hose 1. The fluid swivel 100 is attached to a receiving flow pipe 5 installed on the tanker 3.

At the end of the fluid swivel 100 that faces the loading hose 1, there is a connection arrangement 7, which releasably connects to the end of the loading hose 1. The connection arrangement 7 is only schematically depicted in FIG. 1. It may typically include connection means 9, such as clamps or dogs, configured to engage with an end flange of the loading hose 1. In the present example embodiment, the connection means 9 is hydraulically operated. Two hydraulic lines 11 are schematically indicated in FIG. 1. The hydraulic lines 11 are extended from the tanker 3 and past the fluid swivel 100, for operation of the connection means 9.

As will become clear from the below description of the fluid swivel 100, the hydraulic lines 11 are extended centrally through the swivel 100. Thus, it is not necessary to convey hydraulic lines externally. In this way, the hydraulic lines 11 are arranged protected within the swivel 100.

While FIG. 1 depicts a situation where fluid, e.g. crude oil, is transported onto the tanker 3, it shall be clear that the swivel could be used in other applications. For instance, the fluid swivel 100 could be fixed to a vessel from which fluid shall be flown, such as an FPSO. I.e. a swivel 100 according to the present invention could be arranged at both ends of the loading hose 1.

Figure 2:
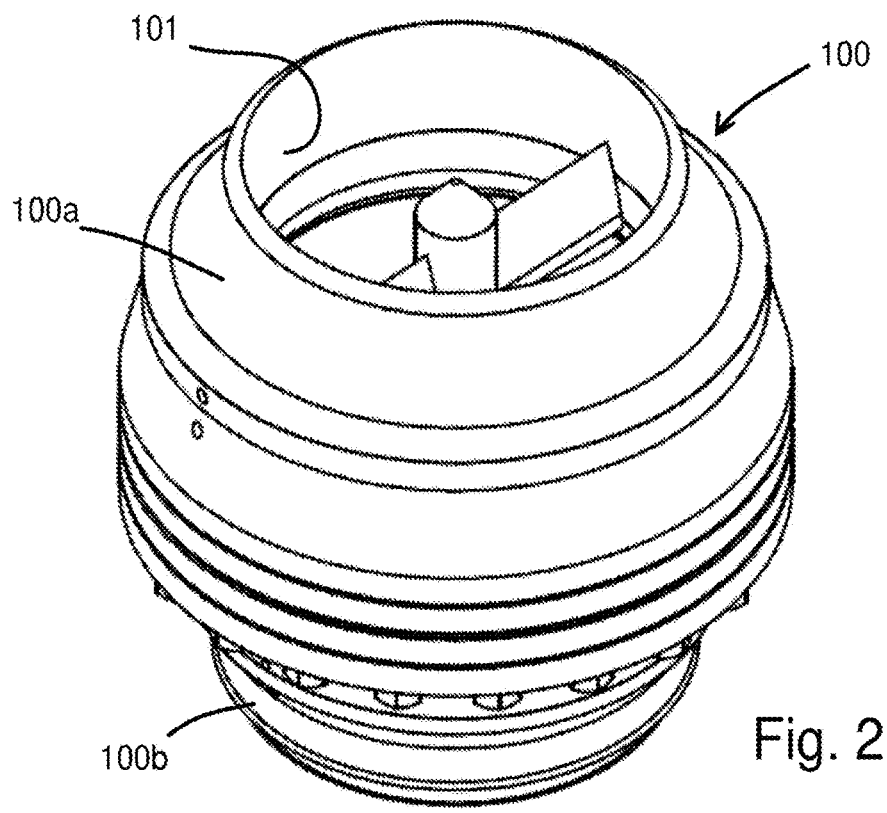
FIG. 2 is a perspective view of a swivel according to the invention.
Figure 3:
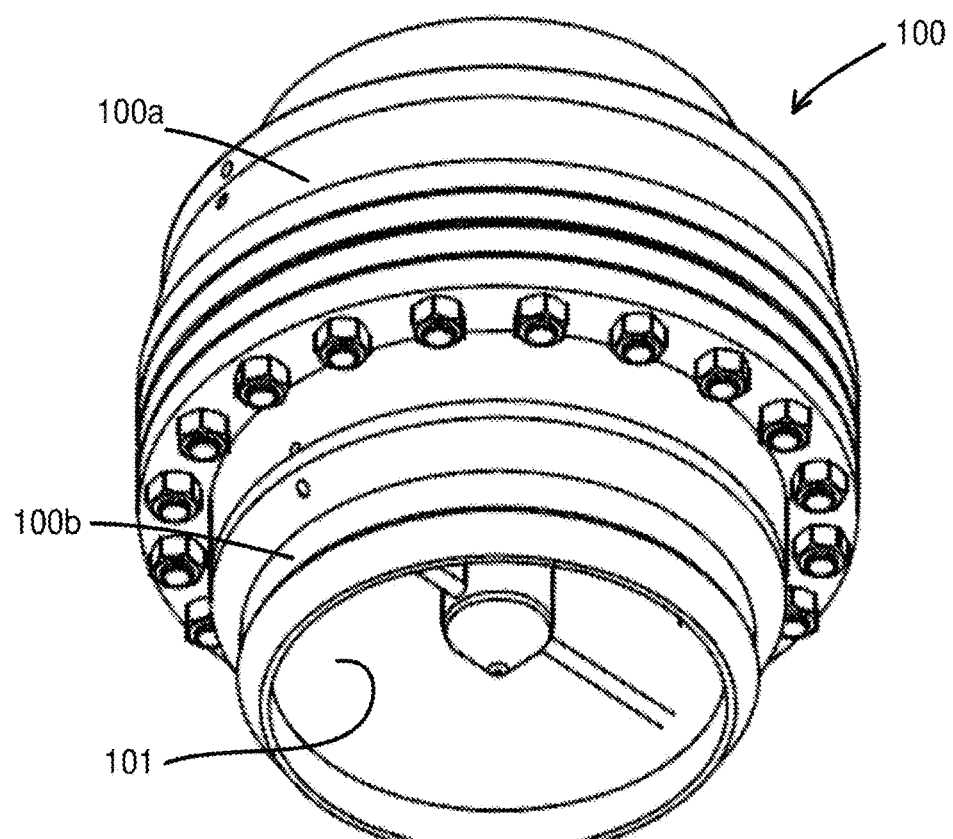
FIG. 3 is a perspective view of the swivel shown in FIG. 2, seen from another angle.

FIG. 2 and FIG. 3 depict the swivel 100 with perspective views, seen partly from above and partly from below. The swivel 100 has a central bore 101 through which a fluid, for instance crude oil, can flow. Furthermore, the swivel 100 comprises a first part 100*a* and a second part 100*b*. The first part 100*a* and the second part 100*b* are mutually rotatable.

When used according to the situation shown in FIG. 1, the second part 100*b* connects to the loading hose 1, while the first part 100*a* is fixed to the tanker 3.

Figure 4:
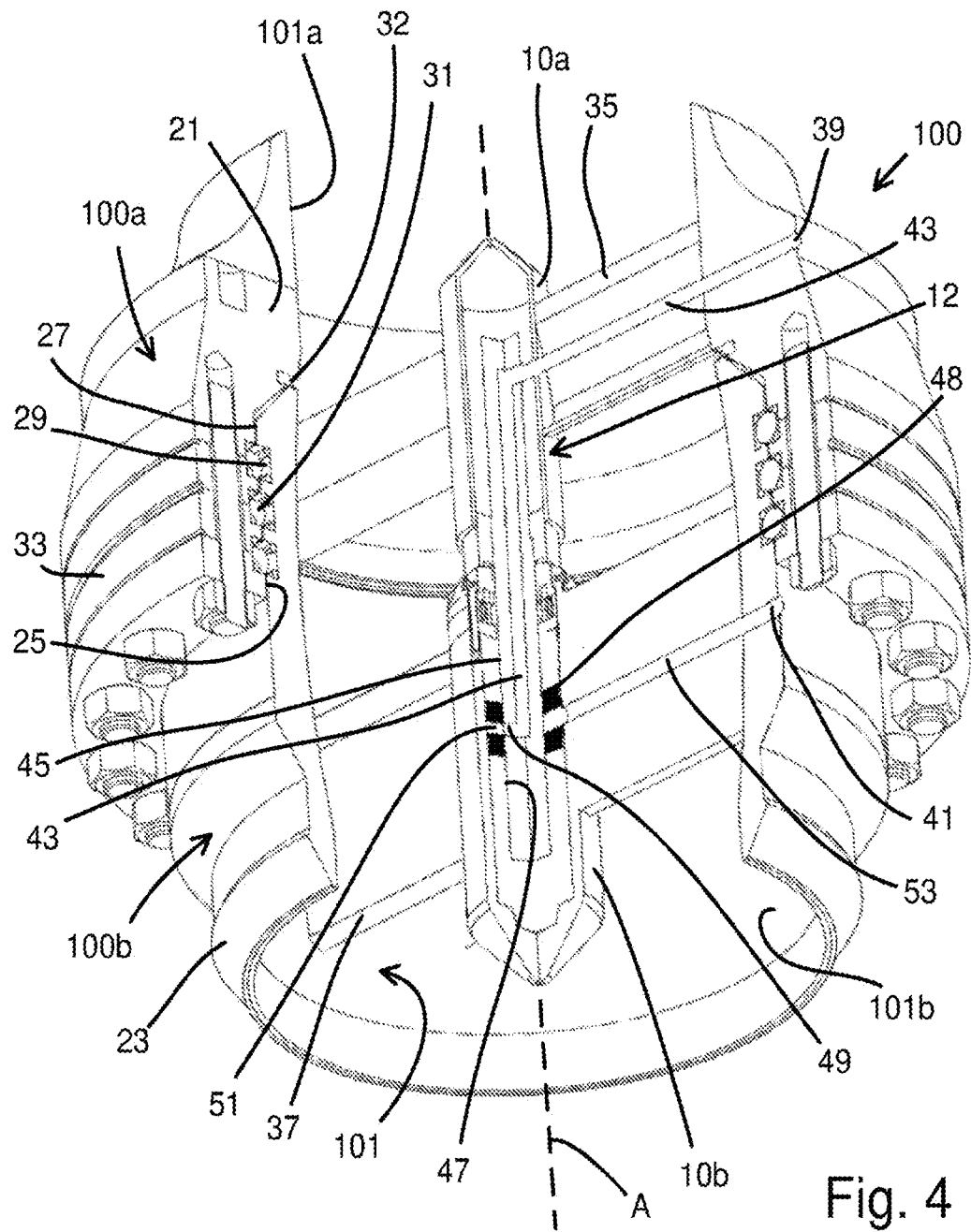
FIG. 4 is a perspective cross section view of a swivel according to the invention.

FIG. 4 illustrates the swivel 100 with a cross section perspective view. The first part 100*a* has a first main body 21. Correspondingly, the second part 100*b* has a second main body 23. An inner face 25 of the first part 100*a* overlaps and faces an outer face 27 of the second part 100*b*. These faces 25, 27 are provided with oppositely arranged annular recesses 29. The recesses 29 accommodate swivel bearings 31 that enables the first part 100*a* and the second part 100*b* to rotate with respect to each other about a common center axis A.

A packer 32 is arranged to seal between the mutually rotating first main body 21 and second main body 23.

The said outer face 27 of the second part 100*b* is arranged on the second main body 23. The inner face 25 of the first part 100*a* is provided by a stack of retainer rings 33. The retainer rings 33 are stacked onto each other and together provides the annular recesses 29 on the inner face 25. The retainer rings 33 are fixed to the rest of the first part 100*a* by means of bolts, as shown in FIG. 4.

Still referring to FIG. 4, centrally arranged in the central bore 101 there is a first central part 10*a* and a second central part 10*b*. The first and central part 10*a*, 10*b* together form a central member 12 that extends along the center axis A with a longitudinal shape.

The first central part 10*a* is a part of the first part 100*a* and is held in place with one or more first beams 35. The first beams 35 extend radially between a bore wall 101*a* of the first part 100*a* and the first central part 10*a*.

Correspondingly, the second central part 10*b* is a part of the second part 100*b* and is held in place with one or more second beams 37. The second beams 37 extend radially between a bore wall 101*b* of the second part 100*b* and the second central part 10*b*.

As can be seen in FIG. 4, the first beams 35 and the second beams 37 are arranged such that fluid can flow past them without being significantly obstructed. In the shown embodiment, the first and second beams 35, 37 exhibit a flat shape that is parallel with the center axis A of the swivel 100.

The swivel 100 comprises a hydraulic connection that extends between a first hydraulic mouth 39 arranged on the first part 100*a* and a second hydraulic mouth 41 arranged on the second part 100*b*. The first hydraulic mouth 39 communicates with a first hydraulic line 43 that extends through the first beam 35. The first hydraulic line 43 extends into the first central part 10*a*.

The first central part 10*a* comprises a stem 45 that extends into a receiving bore 47 of the second central part 10*b*. Hence, when the first and second parts 100*a*, 100*b* rotate with respect to each other, the stem 45 rotates inside the receiving bore 47 of the central part 10*b*.

As shown in FIG. 4, the first hydraulic line 43 extends axially through the first central part 10, into the stem 45. At some axial distance into the receiving bore 47, the first hydraulic line 43 terminates with a first line mouth 49.

The first line mouth 49 faces radially towards an annular recess 51 in the receiving bore 47. On either axial side of the annular recess 51 there is arranged a seal 48 that seals against the stem 45. The annular recess 51 communicates with a second hydraulic line 53 that extends through the second beam 37. The second hydraulic line 53 terminates at the second hydraulic mouth 41.

It will now be apparent to the skilled person that hydraulic liquid and hydraulic pressure can be transmitted between the first hydraulic mouth 39 and the second hydraulic mouth 41. Thus, when the swivel 100 is used for instance as illustrated in FIG. 1, the hydraulic lines 11 coming from the tanker 3 will connect to the first hydraulic mouth 39. The hydraulic lines extending between the swivel 100 and the connection arrangement 7, will connect to the second hydraulic mouth 41.

It will also be appreciated that while only one hydraulic connection is shown in the example embodiment according to FIG. 4, there may be arranged a plurality of hydraulic lines that extend between the first part 100*a* and the second part 100*b*. In such embodiments, the stem 45 can comprise a plurality of first hydraulic lines 43 and first line mouths 49. The receiving bore 47 can be provided with a plurality of annular recesses 51 that are axially distributed and aligned with the first line mouths 49.

Figure 5:
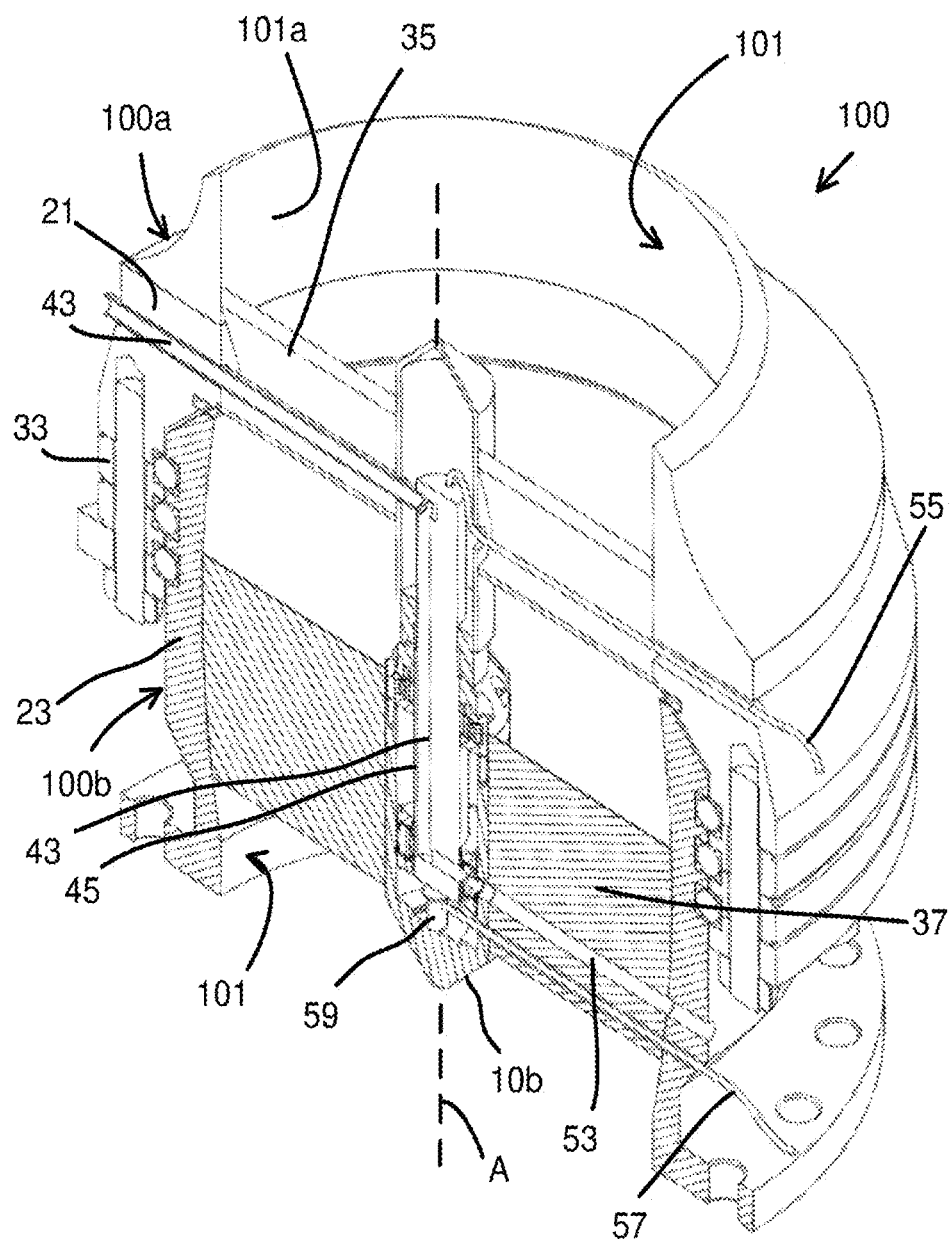
FIG. 5 is another perspective cross section view of the swivel.

FIG. 5 is another cross section perspective view of a swivel 100 according to the present invention. It will be appreciated that it has several features in common with the swivel 100 shown in FIG. 4. For instance, it is configured to transmit hydraulic liquid and pressure through the first hydraulic line 43 and the second hydraulic line 53.

The swivel 100 according to the embodiment shown in FIG. 5 comprises an electric transmission arrangement that is configured to transmit electric signals in addition to the hydraulic transmission. The electric transmission arrangement comprises a first electric line 55 that enters the first main body 21 and extends through the first beam 35 towards the first central part 10*a*. Although not depicted in FIG. 5, the first electric line 55 extends axially through the stem 45 towards the opposite end of the stem 45 (i.e. the lower end in FIG. 5).

The electric transmission arrangement further comprises a second electric line 57 that enters the second main body 23 and extends through the second beam 37 towards the center axis A. The second electric line 57 connects to an electric slip ring 59, which is arranged at the center axis A in the second central part 10*b*. Although not well depicted in FIG. 5, the slip ring 59 provides electric connection between the first electric line 55 and the second electric line 57, both during standstill and during rotation. The slip ring 59 is arranged at the center axis A extending through it.

Thus, during use, the swivel 100 is configured to provide a flow-path for the transferred fluid, such as crude oil, while enabling the operator to hydraulically actuate mechanisms on the rotating side of the swivel, and while controlling electric equipment or electrically reading gauges on the rotating side. Notably, there is no limitations to the number of turns.

Figure 6:
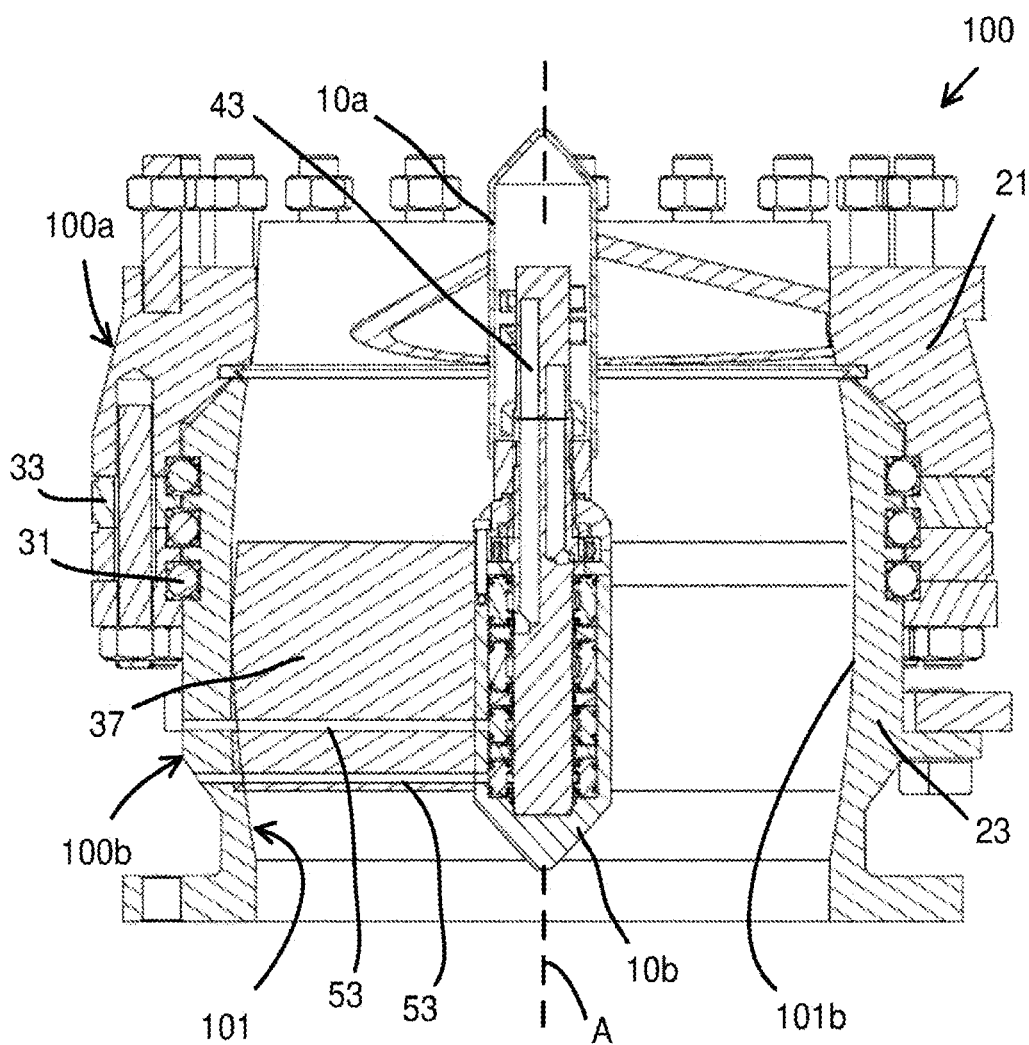
FIG. 6 is a cross section side view of a swivel according to the invention.

FIG. 6 is a cross section side view through a swivel 100 according to the invention. This swivel 100 comprises several second hydraulic lines 53 and thus several first hydraulic lines (not appearing in FIG. 6). This cross section shows two second hydraulic lines 53 in one of the second beams 37, and two first hydraulic lines 43 in the stem 45. The remaining hydraulic lines are not visible.

Also visible from FIG. 6 is a curved shape the bore wall 101*b* of the second part 100*b*. The second central part 10*b* occupies some of the area in the flow path through the swivel 100, i.e. through the central bore 101. By providing the curved shape of the bore wall 101*b* of the second part 100*b*, this is accounted for, at least to some extent. This reduces changes of flow velocity through the swivel 100, since the variation of the cross-sectional area, through which the fluid shall flow, is reduced.

Notably, the cross section of the second central part 10*b*, along a plane orthogonal to the central axis A, is larger than the cross section of the first central part 10*a*. Consequently, the axial position of the said curved shape of the bore wall 101*b* aligns with the second central part 10*b*.

The two opposite ends of the first central part 10*a* and the second central part 10*b* each comprises a coned end portion. The coned end portion is suited for fluid flow past the first and second central parts 10*a*, 10*b*.

The invention claimed is:

1. A fluid swivel comprising:
   a first part and a second part configured to mutually rotate about a common center axis;
   a central bore configured to accommodate a fluid to be transported through the fluid swivel;
   a central member arranged in the central bore, wherein the common center axis extends through the central member;
   a hydraulic line extending from the first part to the second part through the central member;
   wherein the central member comprises a first central part and a second central part;
   wherein the first central part is part of the first part and comprises a stem;
   wherein the second central part is part of the second part and comprises a receiving bore; and
   wherein the stem extends into the receiving bore.

2. The fluid swivel according to claim 1, wherein a portion of the hydraulic line extends through the stem and comprises a first line mouth that aligns with an annular recess of the receiving bore.

3. The fluid swivel according to claim 1, comprising an electric transmission arrangement extending from the first part to the second part through the central member.

4. The fluid swivel according to claim 3, wherein the electric transmission arrangement comprises a first electric line and a second electric line, wherein the first electric line is electrically connected to the second electric line over a slip ring arrangement.

5. The fluid swivel according to claim 1, wherein the fluid swivel is connected between a loading hose carrying an oil-containing fluid and a floating vessel.

6. The fluid swivel according to claim 1, wherein the central bore comprises a bore wall that exhibits a curved shape.

7. The fluid swivel according to claim 2, wherein the slip ring arrangement is axially aligned with the curved shape of the bore wall.

8. The fluid swivel according to claim 1, wherein the central bore has an inner diameter in the range between 20 and 70 cm.

9. The fluid swivel according to claim 8, wherein the inner diameter is in the range of 25 and 60 cm.

10. The fluid swivel according to claim 1, wherein the first and second central part are supported at a radial distance from the bore by first and second beams, respectively.

* * * * *